US010913087B2

(12) United States Patent
Hajakian

(10) Patent No.: US 10,913,087 B2
(45) Date of Patent: Feb. 9, 2021

(54) SYSTEM AND METHOD FOR PRODUCING MOLD-RESISTANT PAPER WITH WET SCRUBBER ASSEMBLY

(71) Applicant: United States Gypsum Company, Chicago, IL (US)

(72) Inventor: Paula Hajakian, Naperville, IL (US)

(73) Assignee: United States Gypsum Company, Chicago, IL (US)

( * ) Notice: Subject to any disclaimer, the term of this patent is extended or adjusted under 35 U.S.C. 154(b) by 618 days.

(21) Appl. No.: 15/248,923

(22) Filed: Aug. 26, 2016

(65) Prior Publication Data
US 2017/0095829 A1 Apr. 6, 2017

Related U.S. Application Data

(60) Provisional application No. 62/237,312, filed on Oct. 5, 2015.

(51) Int. Cl.
*B05C 1/08* (2006.01)
*D21F 11/00* (2006.01)
(Continued)

(52) U.S. Cl.
CPC ............ *B05C 1/0826* (2013.01); *B01D 47/10* (2013.01); *B05C 15/00* (2013.01); *B05C 21/00* (2013.01);
(Continued)

(58) Field of Classification Search
None
See application file for complete search history.

(56) References Cited

U.S. PATENT DOCUMENTS 2,484,277 A 10/1949 Fisher
4,002,441 A 1/1977 Johnson
(Continued)

FOREIGN PATENT DOCUMENTS

WO WO 2011/076268 A1 6/2011
WO WO 2013/182748 A1 12/2013

OTHER PUBLICATIONS

Bauböck, Machine Concept for SuperSoft Tissue, *Paper Asia* 20:9 22-24 (Nov. 2004).
(Continued)

*Primary Examiner* — Christopher P Jones
*Assistant Examiner* — Phillip Y Shao
(74) *Attorney, Agent, or Firm* — Leydig, Voit & Mayer, Ltd.; Philip T. Petti; Pradip K. Sahu

(57) ABSTRACT

Embodiments of a system and a method for preparing mold-resistant paper comprising a wet scrubber assembly in fluid communication with at least one collection plenum disposed at an operational area of a paper manufacturing line. The wet scrubber assembly can be operated to draw a stream of exhaust air from the operational area of the paper manufacturing line through the wet scrubber assembly to remove particulate from the exhaust stream. Such systems and methods can be used to produce mold-resistant paper by coating a paper with an antimicrobial composition including at least one antimicrobial additive at the calendering stage. The collection plenum can be placed in proximate relationship with the calendering stack such that the amount of antimicrobial additive particulate in the air at the calendering stage is reduced. The mold-resistant paper can be used in a gypsum panel.

9 Claims, 6 Drawing Sheets

(51) Int. Cl.

| | | |
|---|---|---|
| *B01D 47/10* | (2006.01) | |
| *B05C 15/00* | (2006.01) | |
| *B05C 21/00* | (2006.01) | |
| *B05D 1/28* | (2006.01) | |
| *B05D 3/12* | (2006.01) | |
| *D21H 21/36* | (2006.01) | |
| *D21H 27/18* | (2006.01) | |

(52) U.S. Cl.
  CPC ............... *B05D 1/28* (2013.01); *B05D 3/12* (2013.01); *D21F 11/00* (2013.01); *D21H 21/36* (2013.01); *D21H 27/18* (2013.01); *B01D 2247/04* (2013.01); *B01D 2247/08* (2013.01); *B01D 2247/101* (2013.01); *B01D 2247/105* (2013.01); *B01D 2247/14* (2013.01)

(56) References Cited

U.S. PATENT DOCUMENTS

| | | | | |
|---|---|---|---|---|
| 4,023,938 | A | * | 5/1977 | Guth ............... B01D 1/007 95/201 |
| 4,469,493 | A | * | 9/1984 | Tuovinen ............ B01D 47/06 261/116 |
| 4,957,512 | A | * | 9/1990 | Denisov ............. B01D 53/18 95/66 |
| 5,279,646 | A | * | 1/1994 | Schwab ............. B01D 47/10 261/116 |
| 5,759,233 | A | * | 6/1998 | Schwab ............. B01D 47/10 95/8 |
| 6,767,647 | B2 | | 7/2004 | Swofford et al. |
| 6,893,752 | B2 | | 5/2005 | Veeramasuneni et al. |
| 7,056,582 | B2 | | 6/2006 | Carbo et al. |
| 7,410,553 | B2 | | 8/2008 | Blanpied et al. |
| 7,732,032 | B2 | | 6/2010 | Dubey |
| 8,282,951 | B2 | | 10/2012 | Redler |
| 8,362,051 | B2 | | 1/2013 | Tinetti et al. |
| 8,568,757 | B2 | | 10/2013 | Krall et al. |
| 8,613,829 | B2 | | 12/2013 | Anderson et al. |
| 8,617,718 | B2 | | 12/2013 | Rohlf et al. |
| 8,618,066 | B1 | | 12/2013 | McDaniel |
| 8,747,534 | B2 | | 6/2014 | Rohlf et al. |
| 9,167,814 | B2 | | 10/2015 | Lange et al. |
| 2004/0005484 | A1 | | 1/2004 | Veeramasuneni et al. |
| 2005/0022667 | A1 | * | 2/2005 | Schwab ............. B01D 47/10 95/216 |
| 2006/0040122 | A1 | | 2/2006 | Carlson et al. |
| 2006/0147681 | A1 | | 7/2006 | Dubey |
| 2006/0171976 | A1 | | 8/2006 | Weir et al. |
| 2006/0199454 | A1 | * | 9/2006 | Blanpied ............ D21H 11/14 442/59 |
| 2010/0016394 | A1 | | 1/2010 | Enzien |
| 2010/0092725 | A1 | | 4/2010 | Goldman |
| 2010/0190017 | A1 | | 7/2010 | Wada et al. |
| 2010/0256204 | A1 | | 10/2010 | Tinetti et al. |
| 2011/0024067 | A1 | | 2/2011 | Anderson et al. |
| 2011/0318574 | A1 | | 12/2011 | Dupre, Jr. et al. |
| 2012/0088114 | A1 | | 4/2012 | Rohlf et al. |
| 2012/0145347 | A1 | * | 6/2012 | Ponka ............... B65H 18/00 162/281 |
| 2012/0171505 | A1 | | 7/2012 | Rohlf et al. |
| 2013/0333323 | A1 | | 12/2013 | Anderson et al. |
| 2014/0227545 | A1 | | 8/2014 | Rohlf et al. |
| 2014/0272376 | A1 | | 9/2014 | Aldabaibeh et al. |
| 2014/0335365 | A1 | | 11/2014 | Wada et al. |
| 2015/0030862 | A1 | | 1/2015 | Rohlf |

OTHER PUBLICATIONS

Lammentausta et al., "Wet Scrubbing Applications in the Pulp and Paper Industry" *Proceedings of the 1996 International Environmental Conference* 2:1 813-816 (Jan. 1, 1996).

European Patent Office, International Search Report and the Written Opinion in International Application No. PCT/US2016/055104 (dated Dec. 22, 2016).

* cited by examiner

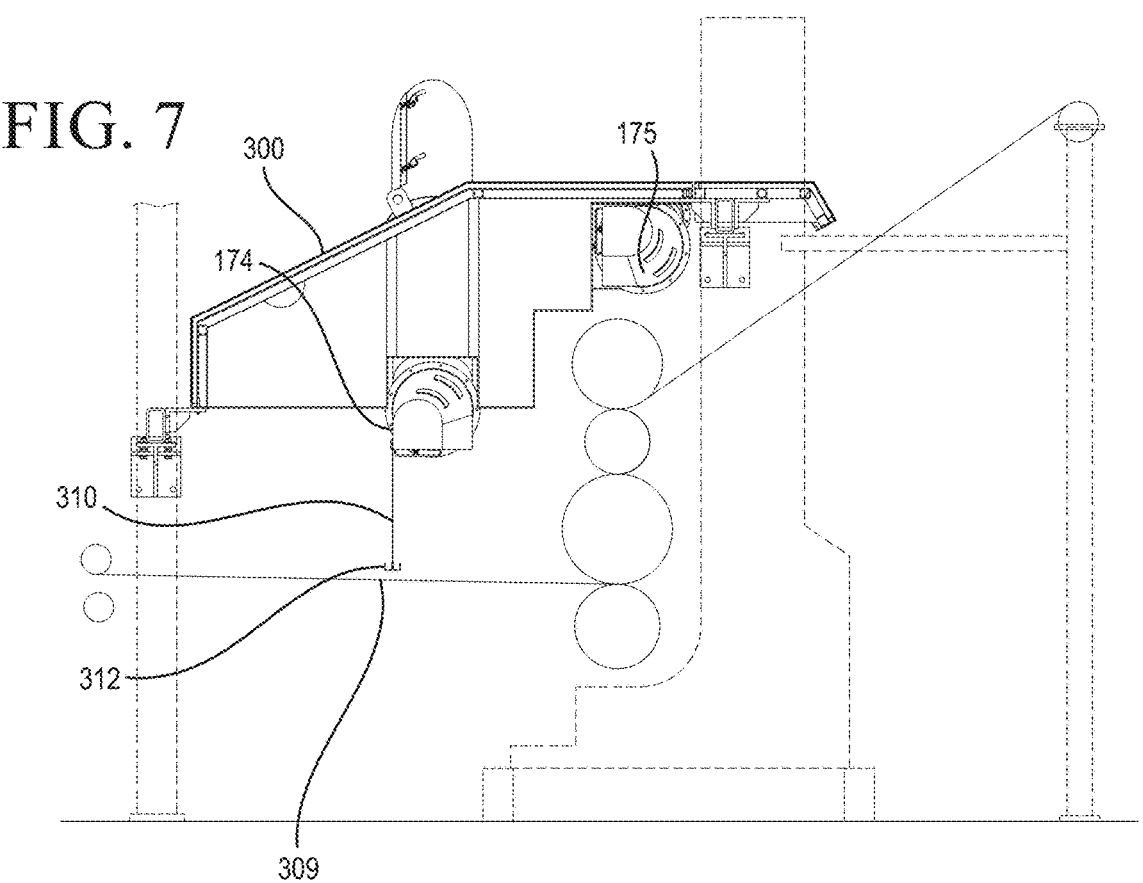
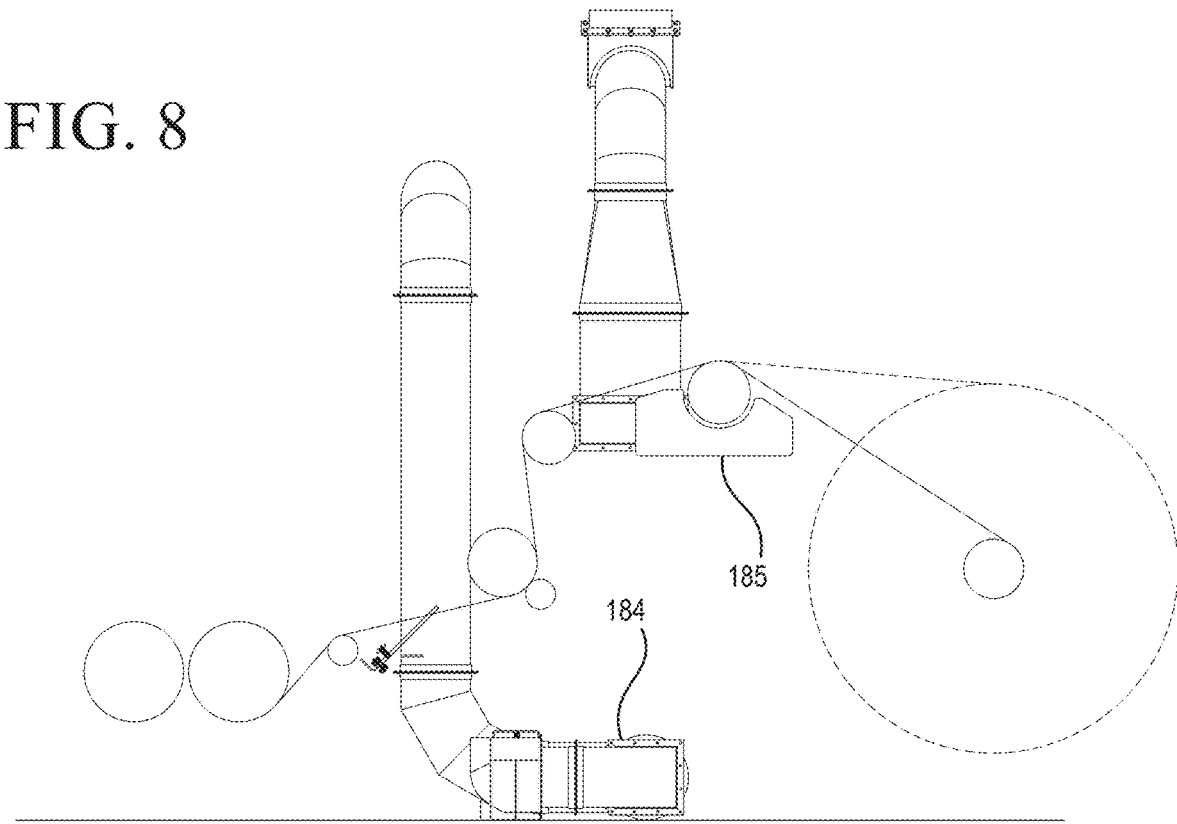

SYSTEM AND METHOD FOR PRODUCING MOLD-RESISTANT PAPER WITH WET SCRUBBER ASSEMBLY

CROSS-REFERENCE TO RELATED APPLICATION

This patent application claims the benefit of priority to U.S. Provisional Patent Application No. 62/237,312, filed Oct. 5, 2015, and entitled, "System and Method for Producing Mold-Resistant Paper With Wet Scrubber Assembly," which is incorporated in its entirety herein by this reference.

BACKGROUND

The present disclosure relates to paper resistant to microbial growth and, more particularly, to a system and method for producing mold-resistant paper for use in a cementitious panel, such as gypsum wallboard.

In many types of cementitious articles, set gypsum (calcium sulfate dihydrate) is often a major constituent. For example, set gypsum is a major component of end products created by use of traditional plasters (e.g., plaster-surfaced internal building walls), and also in faced gypsum board employed in typical drywall construction of interior walls and ceilings of buildings. In addition, set gypsum is the major component of gypsum/cellulose fiber composite boards and products, as described in U.S. Pat. No. 5,320,677, for example. Typically, such gypsum-containing cementitious products are made by preparing a mixture of calcined gypsum (calcium sulfate alpha or beta hemihydrate and/or calcium sulfate anhydrite), water, and other components, as appropriate to form cementitious slurry. The cementitious slurry and desired additives are often blended in a continuous mixer, as described in U.S. Pat. No. 3,359,146, for example.

In a typical cementitious article manufacturing process such as wallboard, gypsum board is produced by uniformly dispersing calcined gypsum (commonly referred to as "stucco") in water to form aqueous calcined gypsum slurry. The aqueous calcined gypsum slurry is typically produced in a continuous manner by inserting stucco and water and other additives into a mixer which contains means for agitating the contents to form a uniform gypsum slurry. The slurry is continuously directed toward and through a discharge outlet of the mixer and into a discharge conduit connected to the discharge outlet of the mixer. Aqueous foam can be combined with the aqueous calcined gypsum slurry in the mixer and/or in the discharge conduit. A stream of foamed slurry passes through the discharge conduit from which it is continuously deposited onto a moving web of cover sheet material (i.e., the face sheet) supported by a forming table.

The foamed slurry is allowed to spread over the advancing face sheet. A second web of cover sheet material (i.e., the back sheet) is applied to cover the foamed slurry and form a sandwich structure of a continuous wallboard preform. Each of the two paper sheets has two sides or surfaces. One side—the back or "bond" side—contacts the gypsum core. The other side—the top or "face" side—is not in contact with the gypsum core and is in opposing relationship to the bond side. The face side of the face sheet is the surface that presents a finish surface for the interior of a room in a typical construction application.

The wallboard preform is subjected to forming, such as at a conventional forming station, to obtain a desired thickness. The calcined gypsum reacts with the water in the wallboard preform and sets as a conveyor moves the wallboard preform down the manufacturing line. The wallboard preform is cut into segments downstream of the forming station at a point along the line where the preform has set sufficiently. The segments are flipped over, dried (e.g., in a kiln) to drive off excess water, and processed to provide the final wallboard product of desired dimensions. The aqueous foam produces air voids in the set gypsum, thereby reducing the density of the finished product relative to a product made using a similar slurry but without foam.

Microbial growth favors environments where spores find moisture and nutrients to metabolize. Water vapor and spores are unavoidable in environments where gypsum panels are used. In addition to moisture that is present in the environment, installed gypsum panels can be subjected to water and/or high-humidity environments due to seepage, leaky roofs or pipes, flooding, condensation, and the like. The paper facers and the additives at the paper-core interface (such as, starch, for example) can provide nutrients used for metabolism to produce microbial growth.

Attempts to make gypsum boards resistant to microbial growth have been made by incorporating an antimicrobial additive (a biocide), such as a salt of pyrithione, into the gypsum core, the facers, or both, as described in U.S. Pat. No. 6,893,752. The '752 patent is entitled, "Mold Resistant Gypsum Panel and Method of Making Same," and is incorporated herein by reference. However, obtaining a mold-resistant paper suitable for a gypsum panel has been proven to be difficult and expensive. In typical previous methods known in the art, a water-soluble or dispersible biocide is added at the wet end of a paper making process. The bulk of the biocide fails to be incorporated into the paper during the forming stage when water is drained and pressed out of the paper mat.

There is a continued need in the art to provide additional solutions to enhance the performance of gypsum panels. For example, there is a continued need for a paper that bears an antimicrobial additive in an amount sufficient to suppress microbial growth and that can be produced in an efficient manner. There is also a continued need for systems and methods for producing mold-resistant paper that help reduce the amount of irritants to which an operator is subjected.

It will be appreciated that this background description has been created by the inventor to aid the reader and is not to be taken as an indication that any of the indicated problems were themselves appreciated in the art. While the described principles can, in some aspects and embodiments, alleviate the problems inherent in other systems, it will be appreciated that the scope of the protected innovation is defined by the attached claims and not by the ability of any disclosed feature to solve any specific problem noted herein.

SUMMARY

In one aspect, the present disclosure is directed to embodiments of a system for producing mold-resistant paper that includes a wet scrubber assembly in fluid communication with an exhaust collection assembly having at least one collection plenum disposed at an operational area of a paper manufacturing line. In another aspect of the present disclosure, embodiments of a method of producing mold-resistant paper are described that include the steps of: disposing a collection plenum adjacent a designated operational area of a paper manufacturing line, the collection plenum in fluid communication with a wet scrubber assembly, and operating the wet scrubber assembly to draw air from the operational area of the paper line into the collection plenum and to direct the air to the wet scrubber assembly as an exhaust gas stream. The exhaust gas stream can be conveyed through the wet scrubber assembly to remove particulate therefrom to produce a cleaned exhaust gas stream. The cleaned exhaust gas stream can be vented from the wet scrubber assembly via an exhaust stack.

In one embodiment, a system for preparing paper includes a paper-manufacturing station, an exhaust collection assembly, and a wet scrubber assembly. The paper-manufacturing station is disposed within an operational area including particulate-laden air. The exhaust collection assembly includes a collection plenum disposed at the operational area. The wet scrubber assembly is in fluid communication with the collection plenum of the exhaust collection assembly.

The wet scrubber assembly includes a venturi scrubber, a separator, an exhaust fan, a pump, and a supply of fluid. The venturi scrubber is in fluid communication with, and interposed between, the collection plenum and the separator. The venturi scrubber is adapted to receive a flow of particulate-laden air from the operational area via the exhaust collection assembly. The venturi scrubber is in fluid communication with the pump to receive the supply of fluid therefrom. The venturi scrubber is configured such that the flow of particulate-laden air received from the operational area passes through the supply of fluid inside the venturi scrubber to entrain particulate from the flow of particulate-laden air in the supply of fluid and to create a flow of an exhaust/liquid mixture. The venturi scrubber is adapted to direct the flow of the exhaust/liquid mixture to the separator. The separator is adapted to separate liquid with entrained particulate from the exhaust/liquid mixture to produce a cleaned exhaust air stream and a drain flow of liquid with entrained particulate. The separator has an air outlet and a liquid outlet. The air outlet of the separator is in fluid communication with the exhaust fan. The exhaust fan is adapted to draw the cleaned exhaust air stream from the separator via the air outlet toward the exhaust fan. The separator is configured such that the drain flow of liquid exits from the separator via the liquid outlet.

In another aspect of the disclosure, a method of preparing paper is described. In the method, a collection plenum is disposed within an operational area at which a paper-manufacturing station is disposed. The collection plenum is in fluid communication with a wet scrubber assembly. The wet scrubber assembly is operated to draw particulate-laden air from the operational area into the collection plenum and to direct the particulate-laden air to the wet scrubber assembly as a stream of particulate-laden exhaust air. The stream of particulate-laden exhaust air is conveyed through the wet scrubber assembly to remove particulate therefrom to produce a cleaned exhaust air stream. The cleaned exhaust air stream is vented from the wet scrubber assembly.

In another embodiment, a method of preparing paper includes disposing a collection plenum adjacent an operational area at which a paper-manufacturing station is disposed. The collection plenum is in fluid communication with a wet scrubber assembly. The paper-manufacturing station is operated such that particulate comprising an antimicrobial additive is emitted into air within the operational area.

An exhaust fan of the wet scrubber assembly is operated to draw a flow of particulate-laden air from the operational area into the collection plenum and to direct the flow of particulate-laden air to a venturi scrubber of the wet scrubber assembly. The flow of particulate-laden air is conveyed through the venturi scrubber along an exhaust flow path such that the flow of particulate-laden air is accelerated and passes through a water stream within the venturi scrubber, thereby entraining particulate from the flow of particulate-laden air in water from the water stream to create a flow of an exhaust/liquid mixture. The flow of the exhaust/liquid mixture is decelerated in the venturi scrubber.

In a separator, water droplets with entrained particulate are removed from the flow of the exhaust/liquid mixture to produce a cleaned exhaust air stream and a drain flow of liquid with entrained particulate. The drain flow of liquid with entrained particulate is drained from the separator. The cleaned exhaust gas stream is vented from the separator.

Further and alternative aspects and features of the disclosed principles will be appreciated from the following detailed description and the accompanying drawings. As will be appreciated, the systems and techniques for producing mold-resistant paper disclosed herein are capable of being carried out and used in other and different embodiments, and capable of being modified in various respects. Accordingly, it is to be understood that both the foregoing general description and the following detailed description are exemplary and explanatory only and do not restrict the scope of the appended claims.

BRIEF DESCRIPTION OF THE DRAWINGS

FIG. 7 is a cross-sectional view of the calender stack and the calender stack collection plenum of FIG. 4 taken along line VII-VII in FIG. 4.

FIG. 8 is a fragmentary, schematic side elevational view of an embodiment of a paper-manufacturing station including a rewinder and a rewinder collection plenum assembly of the exhaust collection assembly of the system for producing mold-resistant paper of FIG. 1, the rewinder collection plenum adapted to be placed in operable arrangement with the rewinder.

Figure 1:
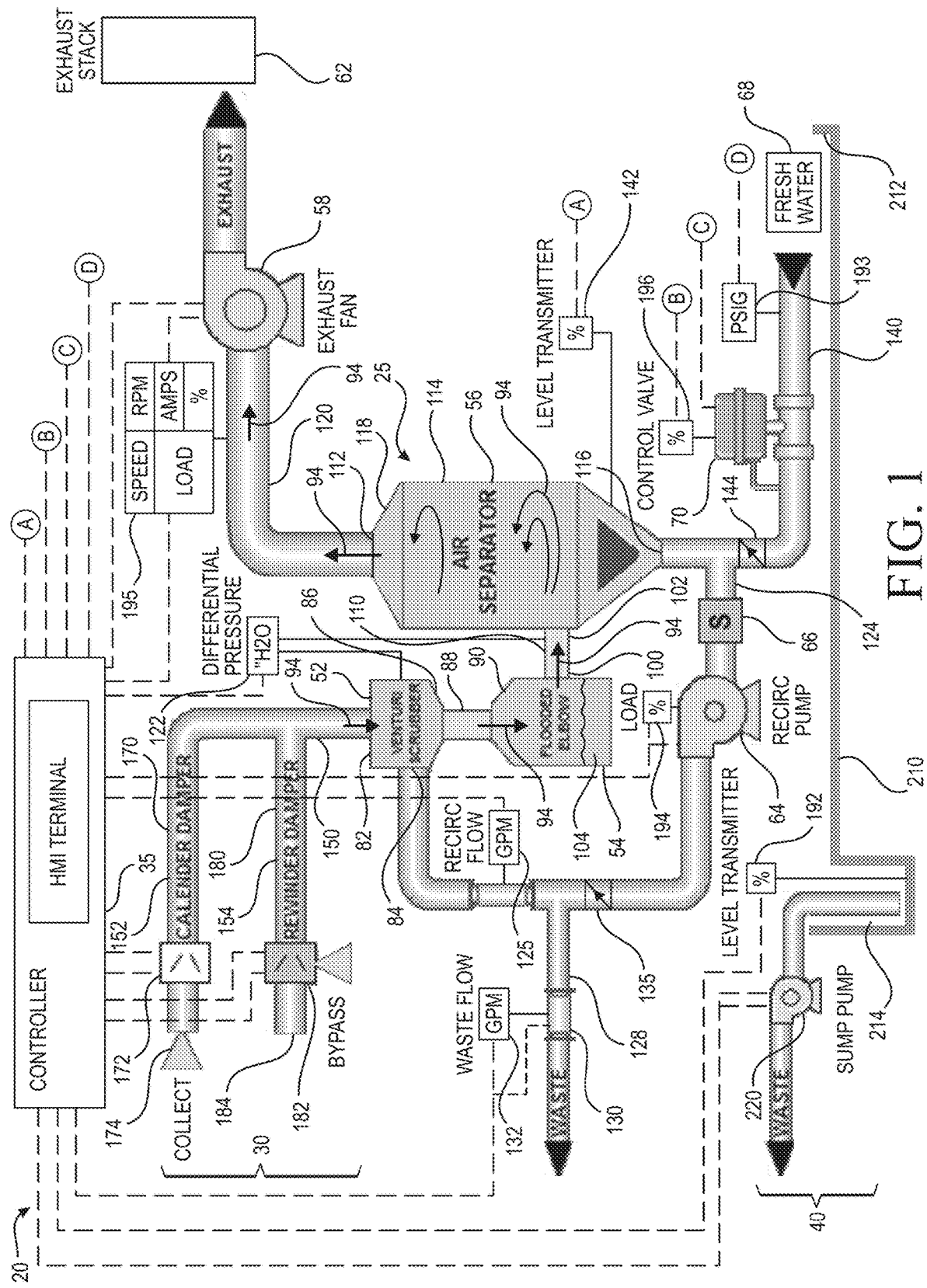
FIG. 1 is a schematic operational diagram of an embodiment of a system for producing mold-resistant paper constructed in accordance with principles of the present disclosure.

It should be understood that the drawings are not necessarily to scale and that the disclosed embodiments are sometimes illustrated diagrammatically and in partial views. In certain instances, details which are not necessary for an understanding of this disclosure or which render other details difficult to perceive may have been omitted. It should be understood that this disclosure is not limited to the particular embodiments illustrated herein.

DETAILED DESCRIPTION OF EXEMPLARY EMBODIMENTS

The present disclosure provides various embodiments of a system and a method for producing mold-resistant paper that can be used in connection with the manufacture of products, including cementitious products, such as gypsum wallboard, for example. Embodiments of a system and a method for producing mold-resistant paper following principles of the present disclosure can be used in a manufacturing process to effectively reduce the amount of an antimicrobial additive (and other additives used in the paper manufacturing process) in the form of fumes, vapor, and/or particles entrained within the air surrounding one or more operational areas of a paper manufacturing line to help improve the air quality along the paper manufacturing line. In embodiments, the wet scrubber assembly can achieve at least 95% removal by weight of the antimicrobial particulate matter in the air from the operational area.

Embodiments of a system and a method following principles of the present disclosure can be used to produce mold-resistant cover paper sheets for gypsum panels, also known as facers, facing material, paper facers, etc. In embodiments, the paper manufacturing process includes preparing a dilute pulp of fibers from wastepaper, water, and suitable chemical additives as will be appreciated by one skilled in the art. The wastepaper is separated from contaminants, pulped, thickened, refined, and drained through a screen to form a mat of random fibers. Additional water is removed by pressing the mat or applying suction. Once drained and pressed, the mat is moved through a dryer section where the remaining water is evaporated. The paper sheet is then processed by a calender stack that increases the moisture content (4-9%) and polishes the surface of the fibrous sheet. The "wet end" refers to the paper-making process before water is removed from the thin stock, followed by paper forming and pressing. The terminal end of the process after pressing to the hope reel is called the "dry end."

In embodiments, a mold-resistant paper is prepared by applying a coating of an antimicrobial additive to at least one of the two paper sides (face and bond) at the calender stack. In embodiments, a mold-resistant paper is prepared during the calendering stage by coating a paper with an antimicrobial composition including at least one antimicrobial additive which can be pre-made in a mix-tank and then fed to the calender stacks from a run-tank with a pump. In embodiments, a coating of the antimicrobial composition is applied in the amount from about 0.10 lb/MSF (pounds per thousand square feet of paper) to about 2.50 lb/MSF.

In some embodiments, a mold-resistant paper is made such that both sides are covered with a coating of an antimicrobial additive. In other embodiments, a coating of an antimicrobial additive is applied only to one side of the paper. In further embodiments, only the face side of paper is coated with an antimicrobial additive. In further embodiments, only the bond side of the paper is coated with an antimicrobial additive. Any suitable equipment, as will be appreciated by one skilled in the art, can be used to perform the paper manufacturing processes.

In embodiments, the coating application or pickup rate on the calender stack can be controlled by fiber type, wastepaper used to form the liner ply or plies, sheet porosity, sheet moisture entering the calender stacks, water resistance of the sheet, sheet density, coating solids, coating foam, coating temperature, paper machine speed and calender stack design or mechanics. In embodiments, the antimicrobial composition can be adjusted so that an antimicrobial additive is applied at 300 ppm to about 4500 ppm.

At least in some embodiments, an antimicrobial composition is pre-heated from about 110° F. to about 160° F. prior to the application at the calender stacks. In still other embodiments, the antimicrobial composition is preheated from about 120° F. to about 140° F. prior to its application The antimicrobial additive can be applied to at least one of the paper sides during the calender stack stage, as is described in U.S. Patent Application No. US2015/0030862, which is entitled, "Mold-Resistant Paper and Gypsum Panel, Antimicrobial Paper Coating and Related Methods" and is incorporated herein by reference. However, applying the antimicrobial additive at the dry end of the paper manufacturing process can cause fumes, vapor, and/or particles of the antimicrobial additive to become entrained within the air surrounding the calender stack area. This airborne particulate can be an irritant for some operators.

Embodiments of a system and a method following principles of the present disclosure allow for the application of an antimicrobial additive at the calender stack area with enhanced collection of particulate, which comprises the antimicrobial additive, borne in the air at the calender stack area. A calender stack collection plenum can be placed in fluid communication with a wet scrubber assembly. The calender stack collection plenum can be associated with the calender stack area such that fumes, vapor, and/or particles of the antimicrobial additive that are present in the air as a result of the application of the antimicrobial additive to the surface of the paper at the calender stack area can be drawn into the calender stack collection plenum and conveyed through the wet scrubber assembly to help remove particulate in the air from the calender stack area, the particulate comprising the antimicrobial additive. By adding the antimicrobial additive at the calender stack area on the surface of the paper, material losses are reduced relative to applying the biocide earlier in the paper manufacturing process at the wet end, thereby yielding cost savings.

Embodiments of a system and a method following principles of the present disclosure allow for the cutting of the mold-resistant paper at a rewinder station to trim the mold-resistant paper to a predetermined nominal width with enhanced collection of particulate comprising the antimicrobial additive borne in the air at the rewinder station area as a result of the trimming operation. A rewinder collection plenum can be placed in fluid communication with a wet scrubber assembly. The rewinder collection plenum can be associated with the rewinder station such that particles from the cutting of the mold-resistant paper at the rewinder station (or otherwise produced at the rewinder station) can be drawn into the rewinder collection plenum and conveyed through the wet scrubber assembly to help remove particulate in the air from the area surrounding the rewinder station, the particulate comprising the antimicrobial additive. In embodiments, two or more rewinder collection plenums can be provided. In still other embodiments, the exhaust collection assembly can include a collection plenum disposed at another operational area of the paper manufacturing line.

In embodiments, various paper grades can be used in a system and method for producing mold-resistant paper following principles of the present disclosure. For example, in embodiments, the paper grade of the mold-resistant paper can be any paper grade suitable for use in mold-resistant gypsum panels, including those disclosed in U.S. Patent Application Publication Nos. US 2015/0030862 and US 2012/0088114, the latter of which is entitled, "Mold-Resistant Gypsum Panel," and is incorporated herein by reference. Suitable paper further includes "Manila" or face paper with a relatively smooth calendered finish compared to the back paper and "Newsline" or back paper with a rougher finish relative to the face paper. In embodiments, both the Manila and Newsline paper grades are multi-ply with at least one liner ply and several filler plies. In embodiments, the Manila paper is multi-ply with at least one liner ply which has shorter fibers as compared to the filler plies of the Manila paper in which longer fibers are used. The shorter fiber length can provide a smoother surface for finishing, such as by painting and decorating. In embodiments, the Newsline paper has the same fiber type in its liner ply as that used in its filler plies.

In embodiments, systems and methods for producing mold-resistant paper following principles of the present disclosure can be used to produce mold-resistant paper that is made with recycled materials (also referred to herein as "News"), including recycled newspaper. In embodiments, the mold-resistant paper can include as much as up to 100% of News by weight of its fiber content. At least in some embodiments, the paper is made of 70% of News and 30% fly leaf fibers (which are short fibers ranging in length between 0.8 to 1.5 mm and with the ash content typically between 20-25%) by weight of its fiber content. In some embodiments, the mold-resistant paper can include up to 80% of News and 20% of fly leaf fibers by weight of its fiber content. In other embodiments, the mold-resistant paper can include up to 90% of News and 10% of fly leaf fibers by weight of its fiber content. In embodiments, the liner for the back paper can comprise old corrugated containers (OCC), double lined kraft (DLK) wastepaper, or a combination thereof, for example. These wastepaper fibers typically have $2/3$ of the fiber ranging in length between 2.5 to 3.6 mm for the softwood kraft liners, and $1/3$ of the fibers ranging from 0.8 to 1.5 mm for the hardwood medium between liners.

The term "mold-resistant" paper includes any paper that includes an antimicrobial additive in an amount sufficient to suppress, delay or prevent microbial growth either completely or partially. The term "microbial growth" is also used broadly and includes growth of bacteria, fungi, yeast, mold, mildew, algae and the like. The term "antimicrobial additive" is used broadly and includes a biocide which is at least one of anti-bacterial, anti-fungal, anti-yeast, and the like.

In embodiments, the ability of a paper to resist mold growth can be evaluated by carrying out a test that is generally-accepted by one skilled in the art of paper manufacture for gypsum panels.

In embodiments, systems and methods for producing mold-resistant paper following principles of the present disclosure can be used to produce paper that is "mold-resistant" according to the specifications published by the American Society for Testing and Materials (ASTM) as G21-15, "Standard Practice for Determining Resistance of Synthetic Polymeric Materials to Fungi." Under this standard, a paper is classified as "mold-resistant" if it receives a rating of one (1 to 10% of the surface is defaced and covered with mold, hereafter simply defacement) or zero (no defacement) on a scale from zero to four in a test following a protocol set forth in ASTM G21-15. In embodiments, systems and methods for producing mold-resistant paper following principles of the present disclosure can be used to produce mold-resistant paper that receives a rating of a one or less according to the specifications set forth in ASTM G21-15.

In embodiments of the present disclosure, a mold-resistant gypsum panel is also provided. The gypsum panel is made by sandwiching a gypsum core between two mold-resistant sheets of paper obtained by coating the paper sheets on at least one side with at least one antimicrobial additive following principles of the present disclosure.

In embodiments, systems and methods for producing mold-resistant paper following principles of the present disclosure can be used to produce paper that is incorporated into a gypsum panel that is "mold-resistant" according to the specifications published as ASTM D3273-12, "Standard Test Method for Resistance to Growth of Mold on the Surface of Interior Coatings in an Environmental Chamber." Under this standard, a gypsum panel is classified as "mold-resistant" if it receives a rating of eight (11 to 20% of the surface is defaced and covered with mold, hereafter simply defacement), nine (1 to 10% defacement), or ten (0% defacement) in a test following a protocol set forth in ASTM D3273-12 during which the gypsum panel is exposed to soil inoculated with mold. In embodiments, systems and methods for producing mold-resistant paper following principles of the present disclosure can be used to produce mold-resistant paper that is used to make a gypsum panel that, in turn, is a "mold-resistant" gypsum panel according to the specifications published in ASTM D3273-12. In embodiments, systems and methods for producing mold-resistant paper following principles of the present disclosure can be used to produce mold-resistant paper used in a gypsum panel that receives a rating of at least an eight according to the specifications set forth in ASTM D3273-12, a rating of at least a nine in other embodiments, and a rating of a ten in still other embodiments.

In embodiments, any suitable antimicrobial additive can be used. Antimicrobial additives suitable for use in embodiments of systems and methods following principles of the present disclosure include a biocide in the form of a fungicide, such as: 3-iodo-2-propynylbutyl carbamate (IPBC); zinc pyrithione (ZPT); zinc oxide; azoxystrobin; thiabendazol; octylisothiazoline; dichloro-octylisothiazoline; zinc dimethyldithiocarbamate; benzimidazole; 3-(3,4-dichloropheny)-1,1-dimethylurea; and diiodomethyl-p-tolylsulfone (DIMTS), for example.

In embodiments, an antimicrobial additive suitable for use in embodiments of systems and methods following principles of the present disclosure comprises a biocide which is hydrophobic and does not dissolve well in water. In some embodiments, the antimicrobial additive is insoluble such that its water solubility is no greater than 35 parts per million (ppm).

In embodiments, an antimicrobial additive is a constituent ingredient of an antimicrobial coating composition. In embodiments, the antimicrobial composition includes at least one antimicrobial additive. In embodiments, the antimicrobial composition includes at least two different antimicrobial additives.

At least in some embodiments, zinc pyrithione can be used in combination with zinc oxide. In other embodiments, azoxystrobin can be used in combination with thiabendazol. In some of such embodiments, an antimicrobial composition includes a fungicide in which from 15 to 25% (by weight) of thiabendazol is mixed with 10 to 20% (by weight) of azoxystrobin. In still other embodiments, an antimicrobial composition includes a fungicide which comprises a dispersion of approximately 19.5% (by weight) thiabendazol and approximately 15% (by weight) azoxystrobin.

In other embodiments, an antimicrobial composition suitable for use in embodiments of systems and methods following principles of the present disclosure includes a co-fungicide comprising a combination of a first fungicide comprising a blend of azoxystrobin and thiabendazol and a second fungicide comprising a different antimicrobial additive. In some of such embodiments, the second fungicide comprises zinc pyrithione, zinc oxide, or a combination of the two compounds.

In embodiments, an antimicrobial composition that is suitable for use in embodiments of systems and methods following principles of the present disclosure includes from 1% to 10% by weight of a biocide, such as a fungicide. In other embodiments, an antimicrobial composition that is suitable for use in embodiments of systems and methods following principles of the present disclosure includes from 1% to 6% by weight of a biocide, such as a fungicide, and from 1% to 4% by weight in yet other embodiments.

Suitable antimicrobial coating compositions include those with an antimicrobial additive in particle form with particle sizes in a range from about 1 micron to about 30 microns. In some embodiments, the antimicrobial additive is in particle form with particles that are larger than 1 micron, but smaller than 15 microns. In further embodiments, the antimicrobial additive is in particle form with particles such that at least 90% of the particles are larger than 1 micron, but smaller than 15 microns. In other embodiments, the antimicrobial additive is in particle form with particles such that at least 90% of the particles are in the range between 8 and 15 microns. In still other embodiments, the antimicrobial additive is in particle form with particles such that at least 90% of the particles are in the range from 10 to 26 microns.

In other embodiments, an antimicrobial composition suitable for use in embodiments of systems and methods following principles of the present disclosure includes an antimicrobial additive and a suitable polymeric surface coating. In some embodiments, the polymeric surface coating of the antimicrobial composition comprises a suitable silicone emulsion, such as, Hexahydro-1,3,5-Tris(2-Hydroxyethyl)-S-Triazine, for example.

In embodiments, an antimicrobial composition suitable for use in embodiments of systems and methods following principles of the present disclosure includes a binder. In embodiments, any suitable binder can be used, such as, carboxymethycellulose (CMC), polyvinyl alcohol (PVOH), styrene acrylic latexes, styrene butadiene, casein, and starches, for example. In embodiments, an antimicrobial composition includes from about 0.01% to about 0.05% by weight of a binder. In some other embodiments, about 0.03% by weight of a binder is used.

In embodiments, an antimicrobial composition suitable for use in embodiments of systems and methods following principles of the present disclosure includes a colorant. Suitable colorants include, but are not limited to, phthalocyanine green from Chromatech, Inc. and Solar P Blue 42L from BASF, Inc. In embodiments, an antimicrobial composition includes from about 0.01% to about 2% by weight of a colorant.

Turning now to the Figures, an embodiment of a system 20 for producing mold-resistant paper constructed according to principles of the present disclosure is shown. The illustrated system 20 includes a wet scrubber assembly 25, an exhaust collection assembly 30, a controller 35, and a sump assembly 40. The wet scrubber assembly 25 is in fluid communication with the exhaust collection assembly 30. The controller 35 is in electrical communication with the wet scrubber assembly 25, the exhaust collection assembly 30, and the sump assembly 40.

In embodiments, the wet scrubber assembly 25 is adapted to receive particulate-laden air from the exhaust collection assembly 30 as an exhaust gas stream and to remove particulate from the exhaust gas stream delivered to the wet scrubber assembly 25 from the exhaust collection assembly 30. In embodiments, the wet scrubber assembly 25 is effective to remove particulate from an operational area of the paper machine line which is associated with the exhaust collection assembly 30. In embodiments, the wet scrubber assembly 25 can reduce the airborne particulate within the dry end of the paper machine line, reduce the accumulation of dust on the machine components at the dry end, and help protect worker health by maintaining respirable dust levels at or below 5 mg/m$^3$ and total dust levels at or below 10 mg/m$^3$ in the operational area at the dry end of the paper machine line. The illustrated wet scrubber assembly 25 includes a venturi scrubber 52, a flooded elbow 54, a cyclone air separator 56, an exhaust fan 58, an exhaust stack 62, a recirculating pump 64, a strainer 66, a source of fresh water 68, and a control valve 70.

The illustrated venturi scrubber 52 includes an exhaust inlet 82, a water inlet 84, a converging section 86, a throat 88, and a diverging section 90. In embodiments, the exhaust inlet 82 is in fluid communication with one or more collection plenums of the exhaust collection assembly 30 to receive particulate-laden air therefrom. The water inlet 84 is in fluid communication with the recirculating pump 64 to receive a supply of water therefrom. In embodiments, the water inlet 84 can comprise a series of tangential feed pipes circumferentially disposed about the exhaust inlet 82 of the venture scrubber 52. In other embodiments, the water inlet can also include another series of tangential feed pipes disposed in, or just upstream of, the throat 88.

The converging section 86 is in fluid communication with the exhaust inlet 82 and the throat 88. The converging section 86 is interposed between the exhaust inlet 82 and the throat 88. The converging section 86 can have a generally conical or frusto-conical shape configured such that the transverse cross-sectional area defined by the interior converging sidewall of the converging section decreases along an exhaust flow path from the exhaust inlet 82 to the throat 88.

The throat 88 is in fluid communication with the converging section 86 and the diverging section 90. The throat 88 is interposed between the converging section 86 and the diverging section 90. The throat 88 can have a generally cylindrical shape such that the transverse cross-sectional area defined by the interior throat sidewall of the throat 88 is substantially circular and substantially the same in the throat 88 along the exhaust flow path from the converging section 86 to the diverging section 90.

The diverging section 90 is in fluid communication with the throat 88 and the flooded elbow 54. The diverging section 90 is interposed between the throat 88 and the flooded elbow 54. The diverging section 90 can have a generally conical or frusto-conical shape configured such that the transverse cross-sectional area defined by the interior diverging sidewall of the diverging section 90 increases along the exhaust flow path from the throat 88 toward the separator 56.

In embodiments, the particulate-laden exhaust air from the exhaust collection assembly 30 enters the venturi scrubber 52 through the exhaust inlet 82 and is directed to the converging section 86. The particulate-laden air travels through the venturi scrubber 52 as an exhaust gas stream along an exhaust flow path 94. In the converging section 86, the particulate-laden air passes through a water stream dispensed at the exhaust inlet 82 through the water sprays of the water inlet 84.

In embodiments, the water inlet 84 includes water sprays at, or just upstream of, the throat 88. In embodiments, the recirculating pump 64 provides a substantially continuous stream of water via the water inlet 84 into the converging section 86. In embodiments, the water inlet 84 is configured to introduce sufficient water into the throat 88 to allow water to be available over the transverse cross-sectional area defined by the interior sidewall of the throat 88 In embodiments, each water spray introduces a water stream tangentially into the converging section 86 such that the water stream swirls circumferentially down through the converging section 86 in a spiral manner, providing the liquid for atomization and protecting the interior surface of the converging section 86 from both abrasion and build-up. In embodiments, the water flow to the venturi scrubber 52 is monitored by the controller 35 to help maintain a desired particulate removal efficiency.

In the throat 88, particulate can be captured in the liquid droplets created by the exhaust gas stream accelerated in the converging section 86 of the venturi scrubber 52. The gas stream is accelerated in the converging section 86 as it moves along the exhaust flow path 94 in response to the decreasing cross-sectional area of the converging section 86. The gas stream, moving at an extremely high velocity in the smaller throat section 88, shears the liquid from the interior sidewall of the throat section 88, thereby producing an enormous number of very tiny water droplets. The high velocity of the exhaust gas stream causes the water to atomize into a very fine mist of water. Particle removal occurs in the throat section 88 as the gas stream mixes through the mist of tiny liquid droplets. The water droplets act in a scrubbing manner to remove particulate from the gas stream. The particulate in the gas stream can be encapsulated in the water droplets, thereby producing a sludge.

The gas stream exits the throat section 88 into the diverging section 90, where the increasing transverse cross-sectional area in the direction of the exhaust flow path 94 causes the gas stream to decrease velocity. In embodiments, the diverging section 90, downstream of the throat 88, can be configured to promote extended contact time for the particulate and scrubbing liquid and to help assist with pressure drop regain.

In embodiments, the pressure drop across the throat section 88, which is related to the velocity of the exhaust gas stream, can be monitored and maintained by the controller 35 to promote particulate collection efficiency. In general, a higher pressure drop across the throat section 88 helps increase collection efficiency. In embodiments, the throat section 88 can include an adjustable damper to vary the transverse cross-sectional area of the throat section at the damper. By varying the position of the throat damper, the operating pressure drop across the throat section 88 can be maintained within a predetermined range to yield a collection efficiency within a desired range. In embodiments, the position of the throat damper can be varied in response to changes in the volume of the exhaust gas stream and/or flow rate of the exhaust gas stream through the throat section 88. In embodiments, the throat damper in the throat section 88 can be adjusted manually. In other embodiments, the position of the throat damper in the throat section 88 can be adjusted automatically via the controller 35 in response to a value for at least one operating condition detected by an appropriate sensor (e.g., a differential pressure sensor).

The flooded elbow 54 is in fluid communication with the diverging section 90 of the venturi scrubber 52 and with the cyclone air separator 56. The flooded elbow 54 is interposed between the diverging section 90 of the venturi scrubber 52 and the cyclone air separator 56. In the illustrated embodiment, the flooded elbow 54 includes an elevated elbow outlet 100 which is in fluid communication with the air separator 56 via a suitable connecting passage 102. The elbow outlet 100 effectively defines a liquid reservoir 104 within the flooded elbow 54 below the elbow outlet 100. Fluid and sludge can accumulate in the liquid reservoir 104 to help cushion the impact of the exhaust gas/liquid mixture being discharged from the diverging section 90 of the venturi scrubber 52 against the opposing interior surface of the flooded elbow 54 and to help prevent the abrasion of the interior surface. In embodiments, the flooded elbow 54 can be equipped with a suitable drain mechanism at the bottom of the liquid reservoir 104 to facilitate periodic cleaning and maintenance.

The cyclone air separator 56 is in fluid communication with the flooded elbow 54 and with the exhaust fan 58. The air separator 56 is interposed between the flooded elbow 54 and the exhaust fan 58. The cyclone air separator 56 includes an air separator inlet 110, an air separator outlet 112, a cyclonic spin chamber 114, a separator liquid outlet 116 below the cyclonic spin chamber 114 and below the air separator inlet 110, and a baffle area 118 disposed above the cyclonic spin chamber 114 and adjacent the air separator outlet 112.

The exhaust gas/liquid mixture moves from the flooded elbow 54 through the air separator inlet 110 into the cyclonic spin chamber 114, where the water droplets are removed from the exhaust gas stream. In embodiments, the exhaust gas/liquid mixture turns and enters the cyclone separator inlet 110 where it is accelerated into the spin zone of the cyclonic spin chamber 114, which is configured to direct the exhaust gas/liquid mixture in a spiral manner. The entrained scrubbing liquid with captured particulate is removed via centrifugal force and drains to the separator liquid outlet 116 below the cyclonic spin chamber 114 at the bottom of the separator vessel such that the exhaust gas/liquid mixture comprises a cleaned exhaust gas stream.

In embodiments, the baffle area 118 includes a plurality of baffles disposed adjacent the separator outlet 112 that are configured as anti-spin baffles that help arrest the spinning movement of the cleaned exhaust gas stream. After traversing through the anti-spin baffles, the cleaned exhaust gas stream exits in a relatively straight-line stream flow through the separator outlet 112 into an exhaust outlet duct 120 which extends between the separator outlet 112 and the exhaust fan 58 and between the exhaust fan 58 and the exhaust stack 62. The exhaust outlet duct 120 is in fluid communication with the air separator 56, the exhaust fan 58, and the exhaust stack 62. In embodiments, the cleaned exhaust gas stream exits the air separator 56 through the separator outlet 112, travels through the exhaust outlet duct 120 and out the exhaust stack 62 to the atmosphere.

In embodiments, the exhaust fan 58 can be any suitable fan capable of generating a sufficient suction force through the exhaust collection assembly 30. In embodiments, the exhaust fan 58 is configured to generate sufficient air flow such that the velocity of the air being taken in by the exhaust collection plenums of the exhaust collection assembly 30 at the paper machine line is sufficient to pull the particulate and vapor from the ambient air at the operational area of the paper machine line. In embodiments, the exhaust fan 58 can include a motor that has a variable frequency drive to control for changing speeds or for various paper grades, for example. In other embodiments, the motor of the exhaust fan 58 can be belt driven, such as in instances where the operating conditions are generally consistent.

In general, increasing the rate of air flow generated by the exhaust fan 58 increases the vacuum generated in the exhaust collection assembly 30. The increased suction also increases the velocity of the particle-laden exhaust gas stream through the venturi scrubber 52 and also increases the pressure differential across the throat section 88 thereof, thereby producing smaller water droplets and generating enhanced collection efficiency.

In embodiments, a differential pressure sensor 122 is in electrical communication with the controller 35. The differential pressure sensor 122 is arranged with the venturi scrubber 52 such that the sensor 122 detects the differential pressure across the throat section 88 of the venturi scrubber 52. In embodiments, the controller 35 can be configured to modify the operation of the motor of the exhaust fan 58 in response to an electrical signal indicative of the differential pressure across the throat section 88 of the venturi scrubber 52 transmitted to the controller 35 via the differential pressure sensor 122. In embodiments, the controller 35 can control the operation of the exhaust fan 58 to maintain the differential pressure (as sensed by the differential pressure sensor 122) across the throat section 88 of the venturi scrubber within a predetermined range.

The scrubbing liquid with captured particulate drains from the separator vessel via the separator liquid outlet 116 into a recirculation passage 124. The recirculation passage 124 is in fluid communication with the cyclone air separator 56, the recirculating pump 64, and the venturi scrubber 52. In the illustrated embodiment, the recirculation passage 124 conveys scrubbing liquid from the separator liquid outlet 116 to the recirculating pump 64 for recirculation back to the water inlet 84 of the venturi scrubber 52.

The recirculation pump 64 is adapted to recirculate the bulk of the scrubber water through the loop formed by the recirculation passage 124, the venturi scrubber 52, the flooded elbow 54, and the cyclone air separator 56. In embodiments, the recirculation pump 64 is configured to feed a flow of water above a predetermined threshold flow rate to the venturi scrubber 52 wherein the predetermined threshold flow rate correlates to a minimum threshold scrubber efficiency. In embodiments, the recirculation pump 64 can comprise any suitable pump, as will be appreciated by one skilled in the art. In embodiments, the pump 64 can be replaced with a chopper pump, as one skilled in the art would understand.

In the illustrated embodiment, a flow meter 125 is interposed between the recirculation pump 64 and the water inlet 84 of the venturi scrubber 52. The flow meter 125 is in electrical communication with the controller 35 and is configured to send the controller a signal indicative of the flow rate through the recirculation passage 124. The controller 35 is configured to adjust the operation of the recirculating pump 64 in response to the signal it receives from the flow meter 125 to maintain the flow rate of the water into the water inlet 84 of the venturi scrubber 52 within a desired flow rate range.

In the illustrated embodiment, the strainer 66 is interposed between the separator liquid outlet 116 of the cyclone air separator 56 and the recirculating pump 64 in the recirculation passage 124. The strainer 66 can be provided to help protect the recirculating pump 64 from contaminants and materials that could damage the recirculating pump 64. In embodiments, the strainer 66 can comprise any suitable strainer device, as will be appreciated by one skilled in the art, such as a basket strainer or a cartridge-style strainer, for example.

In embodiments, the controller 35 is configured to selectively manage the discharge of water with particulate from the recirculation loop back into the mill process water. In embodiments, a portion (a "bleed flow") is periodically removed from the recirculation loop formed via a waste flow line 128 connected to the recirculation passage 124. The waste flow line 128 is in selective fluid communication with the recirculation passage 124 via a suitable valve 130, such as, a solenoid valve, for example. In embodiments, the bleed flow can be directed to a process water tank for the paper machine line.

In embodiments, the valve 130 of the waste flow line 128 is in electrical communication with the controller 35 such that the controller 35 can selectively open and close the valve 130 to correspondingly permit and restrict the bleed flow. In embodiments, the controller 35 can be configured such that it carries out a periodic, timed purge of the recirculation passage 124 through the waste flow line 128 at a predetermined flow rate to help prevent fiber accumulation in the recirculation passage 124, which may lead to plugging. The bleed flow can be measured by a suitable flow meter 132 which is in electrical communication with the controller 35. In embodiments, the recirculation passage 124 can include a suitable check valve 135 associated relative to the junction between the waste flow line 128 and the recirculation passage 124 to prevent the flow of fluid from the waste flow line 128 toward the recirculation pump 64.

In the illustrated embodiment, a fresh water passage 140 is in fluid communication with the cyclone air separator 56 and the recirculation passage 124. The fresh water passage 140 is in fluid communication with the cyclone air separator 56 and the fresh water source 68.

In embodiments, the controller 35 selectively supplies the cyclone air separator 56 with water from the fresh water source 68 to maintain the liquid level within the vessel the air separator 56 at a selected value for the fluid level as sensed by a separator level transmitter 142. The separator level transmitter 142 is in electrical communication with the controller 35. In embodiments, the controller 35 can maintain the liquid level in the vessel of the air separator 56 within a predetermined volume range such that the liquid in the vessel develops a head pressure within a predetermined pressure range to help the recirculation pump 64 circulate the liquid back to the venturi scrubber 52.

In embodiments, the fresh water passage 140 includes a suitable check valve 144 that is configured to allow flow from the fresh water source 68 to the air separator 56 and to prevent fluid flow in the reverse direction across the check valve 144 from the air separator 56 to the fresh water source 68. In embodiments, the vessel of the air separator 56 includes an overflow drain that is configured to drain fluid from the vessel once the volume of liquid in the vessel of the air separator 56 exceeds a predetermined threshold. In embodiments, the overflow drain of the air separator 56 can direct the overflow fluid to the sump pump assembly 40.

In embodiments, the exhaust collection assembly 30 is configured to convey air from at least one operational area along the paper machine line to the wet scrubber assembly 25. In the illustrated embodiment, the exhaust collection assembly 30 includes a main collection passage 150, a calender trunk 152, and a rewinder trunk 154. The main collection passage 150 is in fluid communication with the exhaust inlet 82 of the venturi scrubber 52 and with both of the calender trunk 152 and the rewinder trunk 154. The calender trunk 152 and the rewinder trunk 154 are connected in parallel to the main collection passage 150.

The calender trunk 152 is associated with the calender stack area of the paper machine line. The calender trunk 152 includes a calender collection passage 170, a calender damper 172, and a calender collection plenum 174. The calender collection passage 170 is in fluid communication with the main collection passage 150.

The calender collection passage 170 of the calender trunk 152 is in fluid communication with the calender collection plenum 174. The calender collection plenum 174 is disposed in proximate relationship to the calender stack at the calender stack area of the paper machine line. The calender damper 172 is interposed between the calender collection plenum 174 and the main collection passage 150. In embodiments, a calender hood can be associated with the calender plenum 174 to facilitate the inflow of air from the operational area surrounding the calender stack. In embodiments, the calender collection plenum is positioned with respect to the paper advancing through the calender stack such that an opening of the calender collection plenum is in proximate relationship to the paper at or downstream of the application of a coat of antimicrobial composition upon the paper.

The rewinder trunk 154 is associated with the rewinder area of the paper machine line. The rewinder trunk 154 includes a rewinder collection passage 180, a rewinder damper 182, and a rewinder collection plenum 184. The rewinder collection passage 180 is in fluid communication with the main collection passage 150. The rewinder collection passage 180 of the rewinder trunk 154 is in fluid communication with the rewinder collection plenum 184. The rewinder collection plenum 184 is disposed at the rewinder area of the paper machine line. The rewinder damper 182 is interposed between the rewinder collection plenum 184 and the main collection passage 150. In embodiments, the rewinder trunk 154 can include at least two terminal collection plenum passages that terminate in respective rewinder collection plenums. In embodiments, one or more rewinder collection plenums is positioned within the rewinder operational area to help draw ambient air from the rewinder operational area.

In embodiments, the exhaust collection assembly 30 can include a collection plenum located at a single operational area of the paper machine line. In embodiments, the exhaust collection assembly 30 can include a collection plenum located at a different operational area of the paper machine line. In embodiments, the exhaust collection system 30 includes a calender canopy hood, a calender stack collection plenum, and first and second rewinder collection plenums. In embodiments, the exhaust collection assembly 30 can include a collection plenum located at more than two operational areas of the paper machine line.

In embodiments, the controller 35 can be configured to selectively operate the calender damper 172 and the rewinder damper 182 to exhaust particulate-laden air from the respective operational areas of the paper machine line. In embodiments, the controller 35 can be configured to operate independently the calender damper 172 and the rewinder damper 182. In embodiments, the controller 35 is in electrical communication with a respective position sensor associated with each of the calender damper 172 and the rewinder damper 182. In addition, the controller 35 can be in operable relationship with a damper driver (such as a pneumatic cylinder, for example) to selectively adjust the position of the respective dampers 172, 182. In embodiments, the controller 35 is configured to adjust the position of the calender damper 172 and the rewinder damper 182 independently in response to one or more operational parameters (e.g., the differential pressure across the throat section 88 of the venturi scrubber 52) to maintain the collection efficiency of the wet scrubber assembly 25 within a predetermined range.

In embodiments, the controller 35 is configured to allow for separate control of the calender damper 172 and the rewinder damper 182 to independently control the intake of air from, respectively, the calender stack area and the rewinder area of the paper machine line. In embodiments, the controller 35 is configured to operate in an automatic mode to allow for automatic collection of air from the calender stack area and the rewinder area depending upon whether the controller receives an indication from an appropriate sensor that, respectively, paper is threaded up through the calender stack, and the rewinder is operating. In embodiments, the controller 35 can be configured to allow an operator to run the system 20 via a manual mode and to collect particulate from one or both of the operational areas.

In embodiments, the controller 35 includes a suitable processor (such as a programmable logic controller (PLC), for example and at least one control panel with a display device adapted to display a suitable human-machine interface (HMI) configured to interact with the processor. In embodiments, operator control panels of the controller 35 can be located at the wet scrubber assembly 25 as well as at the paper machine line. In embodiments, the operator control panel is configured to allow for the viewing of at least one operational parameter of the system 20.

In embodiments, the controller 35 is in electrical communication with a at least one instrument configured to send the controller an electrical signal indicative of one or more operating parameters of the system 20. In embodiments, the controller 35 is in electrical communication with a variety of instruments associated with various components of the system 20 in order to facilitate the control of the system 20 via the controller 35. For example, in embodiments, the controller 35 is in electrical communication with instruments configured to sense or operate one or more of the following: air separator water level 142 in the air separator vessel, fresh makeup water valve 70, recirculation pump flow 125, scrubber waste water flow 132, pressure differential 122 across the throat section 88 of the venturi scrubber 52, sump level 192, calender diverter damper 172, calender diverter damper limit (collect), calender diverter damper limit (bypass), rewind diverter damper 182, rewind diverter damper limit (collect), rewind diverter damper limit (bypass), makeup water pressure 193, recirculation pump motor load 194, exhaust fan motor speed and load 195, and control valve position 196.

In embodiments, the controller 35 is configured such that an operator can use an HMI to run the system 20 in different modes. In embodiments, an automatic mode allows the operator to set and operate each component of the system 20 through programming stored within, or accessible by, the controller 20. In embodiments, a manual mode allows the operator to set and operate one or more components of the system 20 manually.

In embodiments, the controller 35 is in electrical communication with a calender stack loading sheet break detector positioned at the calender stack. If the sheet break detector senses the presence of a sheet, the controller 35 can move the calender damper 172 to collect, causing process air to be drawn from the calender stack area through the calender collection plenum 174. If the sheet break detector does not sense the presence of a sheet in the calender stack, the controller can place or maintain the calender damper 172 to the bypass position in which the calender trunk 170 is occluded such that air is not taken up through the calender collection plenum 174.

In embodiments, the controller 35 is in electrical communication with a rewinder sheet break detector positioned at the rewinder. If the sheet break detector senses the presence of a sheet in the rewinder, the controller 35 can move the rewinder damper 182 to collect, causing process air to be drawn from the rewinder area through the rewinder collection plenum(s) 184. If the sheet break detector does not sense the presence of a sheet in the rewinder, the controller 35 can place or maintain the rewinder damper 182 to the bypass position in which the rewinder trunk 180 is occluded such that air is not taken up through the rewinder collection plenum(s) 184.

In embodiments, each collection plenum includes a diverter damper that can be moved between a process position in which the collection plenum defines a process intake opening in proximate relationship to equipment of the paper machine line and a machine room position in which the collection plenum defines a machine room intake opening in communication with the ambient air of the surrounding operational area and the process intake opening is closed. In embodiments, the controller 35 is in electrical communication with each diverter damper such that the controller 35 moves the collection plenum to the machine room position if an associated sheet break detector does not sense the presence of a sheet in the associated equipment of the paper machine line with which that particular collection plenum is associated. This causes ambient air to be drawn from the vicinity of the paper machine instead of process air being drawn from the on-machine dust pickups if the associated paper break detector fails to sense the presence of a sheet of paper in the equipment at the designated area (in spite of the fact that it might be a false break) to prevent the sheet from being drawn into a dust pickup when a portion of the sheet is still being wound.

In embodiments, the controller 35 can be used to move either the calender pick-up diverter damper or the rewinder pick-up diverter damper to the machine room position at any time, when initiated by the operator, causing ambient air to be drawn from the vicinity of the paper machine instead of process air being drawn from the all dust pickups. In embodiments, the operator can divert to machine room using an HMI.

In embodiments, the sump assembly 40 includes a concrete pad 210, defining a dike 212 and a sump pit 214, and a sump pump 220 at least a portion of which being disposed within the sump pit 214. The dike 212 and the sump pit 214 of the concrete pad 210 can be configured to contain storm water and any overflow from the wet scrubber assembly 25 or other components of the system 20. In embodiments, the sump pump 220 can be configured to selectively manage the discharge of water from the sump pit 214 to a source of mill process water.

In embodiments, the controller 35 can be configured to operate the sump pump assembly 40 independently of the wet scrubber assembly 25 and/or the exhaust collection assembly 30. In embodiments, the sump pump assembly 40 is independently operated by the controller 35 in either a manual or an automatic mode by the operator from an HMI. In the automatic mode, the controller 35 operates the sump pump assembly 40 when the sump level transmitter 192 senses the level of water in the sump reaches a first threshold level, and shuts off the sump pump assembly 40 once the level is below a second threshold level. In embodiments, the second threshold level is less than the first threshold level.

Figure 2:
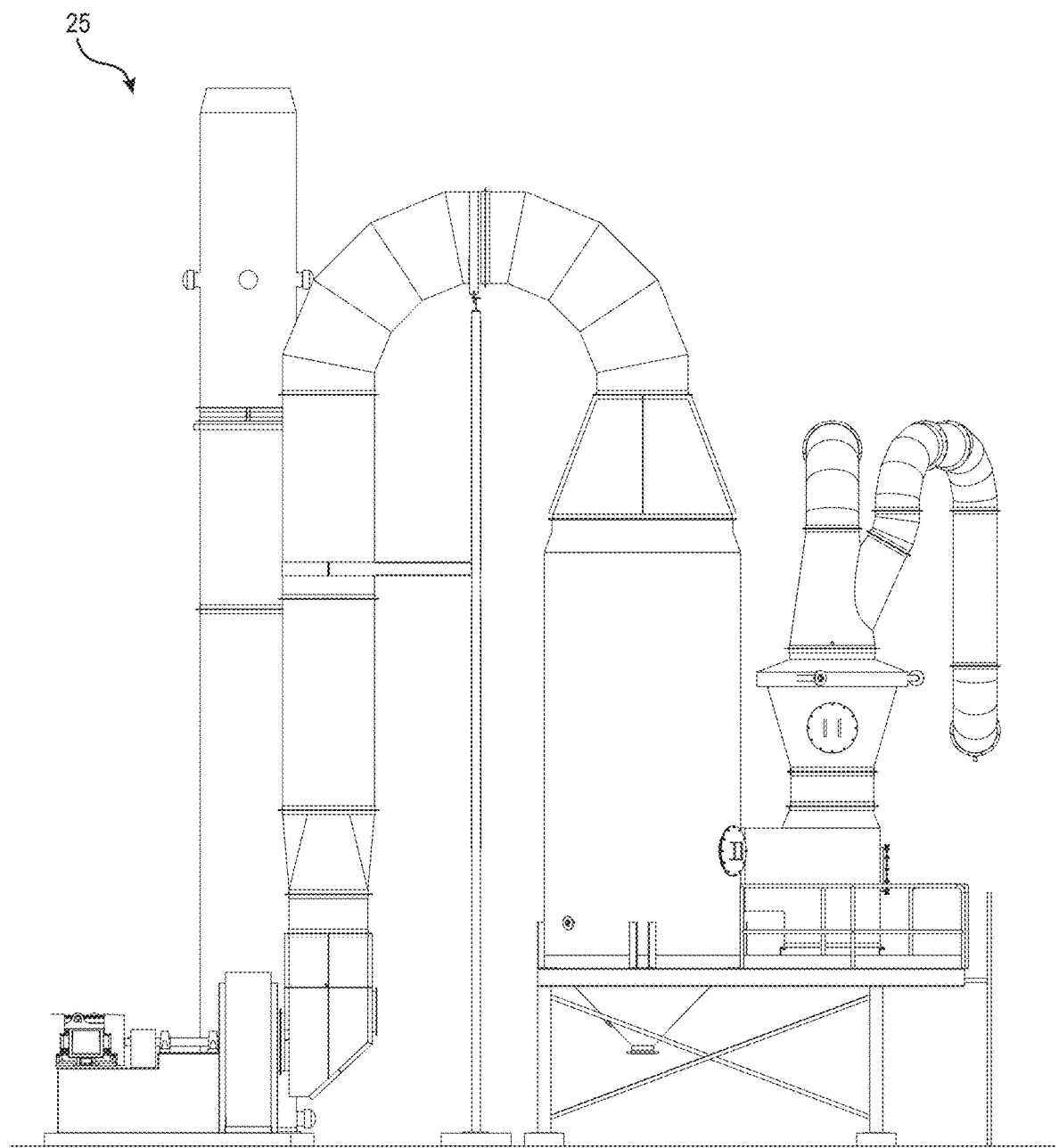
FIG. 2 is a schematic, fragmentary elevational view of an embodiment of a wet scrubber assembly and a scrubber inlet portion of an exhaust collection assembly of the system of FIG. 1.
Figure 3:
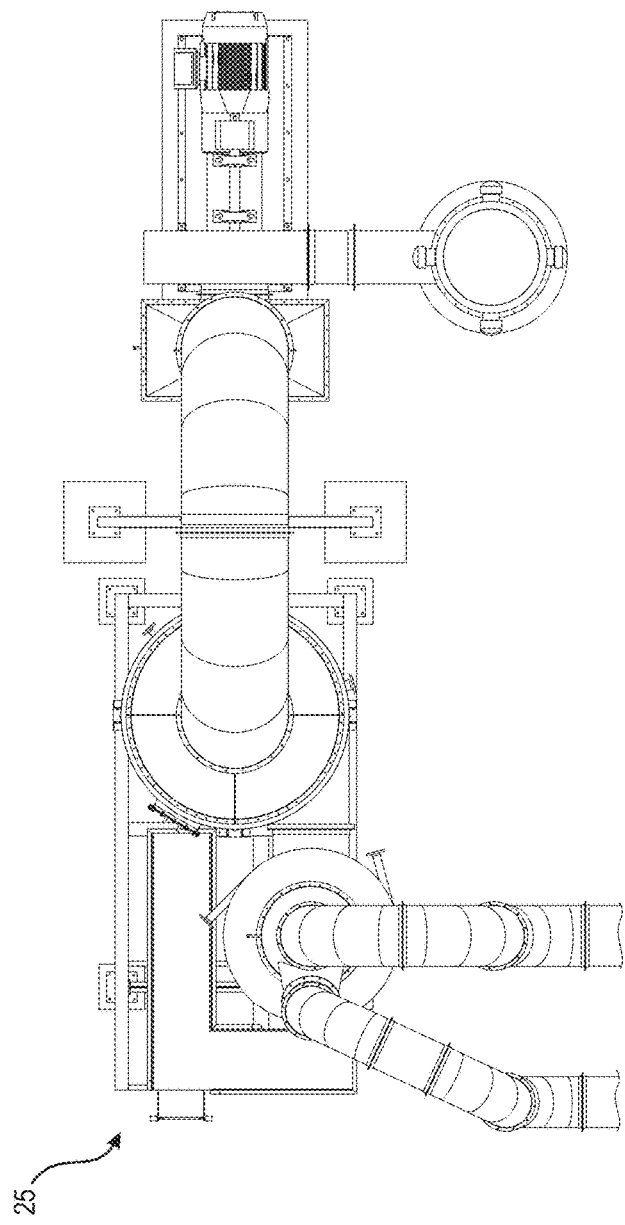
FIG. 3 is a fragmentary, top plan view of the wet scrubber assembly and the scrubber inlet portion of the exhaust collection assembly as in FIG. 2.
Figure 4:
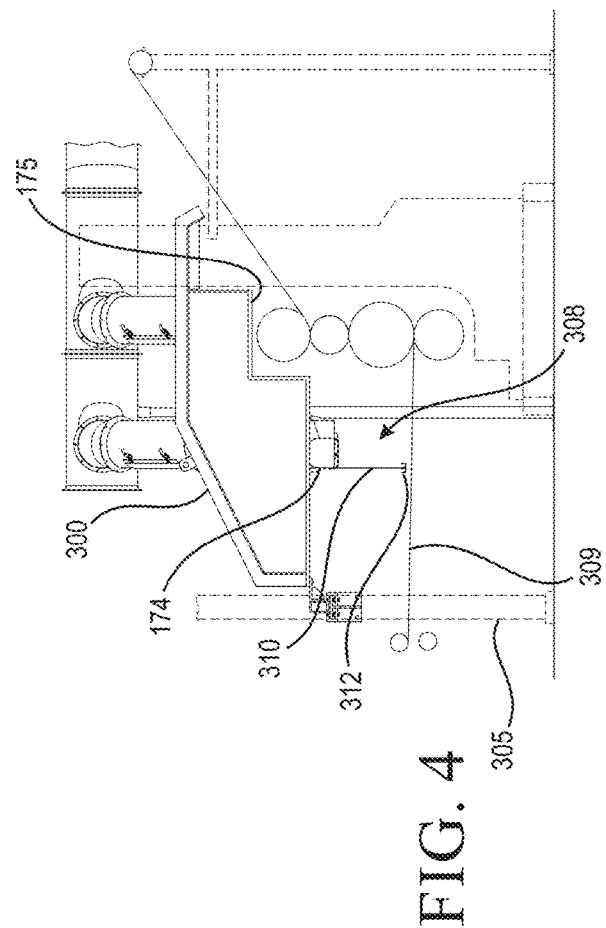
FIG. 4 is a fragmentary, schematic side elevational view of an embodiment of a paper-manufacturing station including a calender stack and a calender stack collection plenum of the exhaust collection assembly of the system for producing mold-resistant paper of FIG. 1, the calender stack collection plenum adapted to be placed in operable arrangement with the calender stack.
Figure 5:
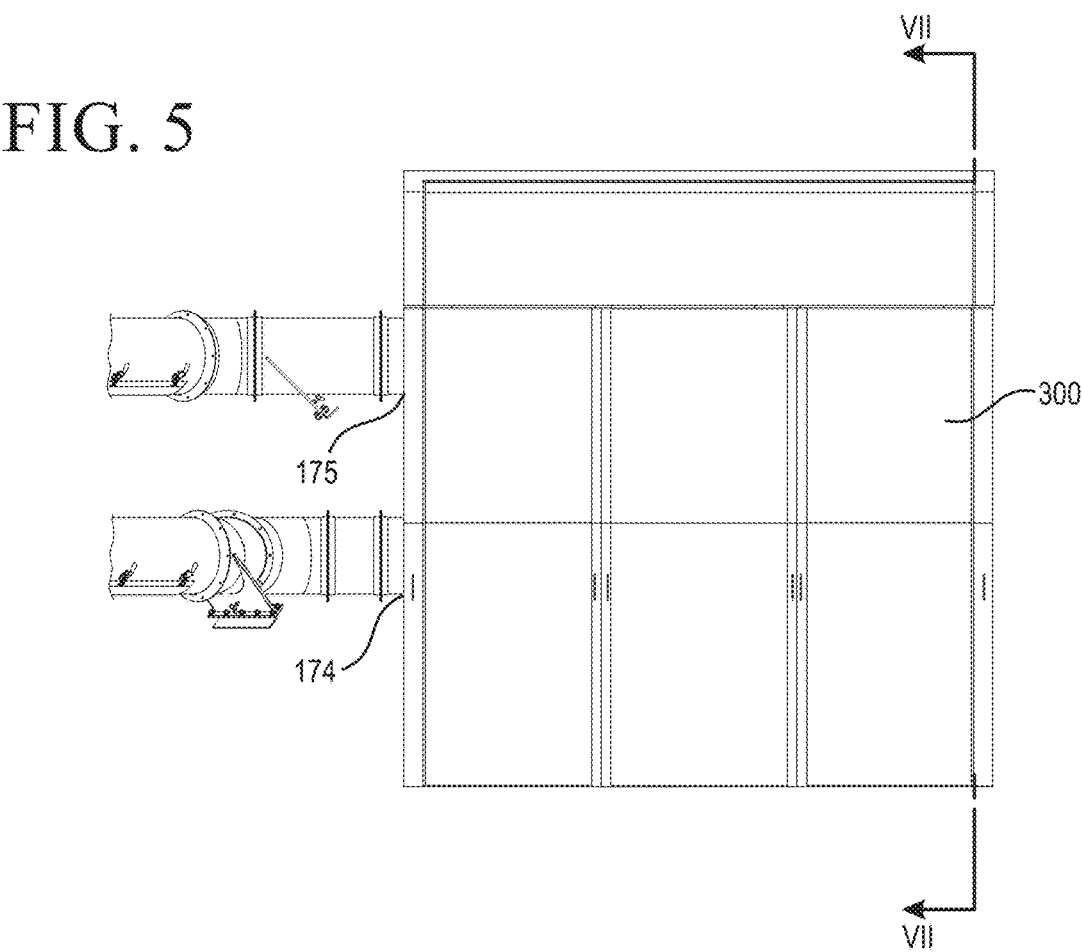
FIG. 5 is a top plan view of the calender stack collection plenum of FIG. 4.
Figure 6:
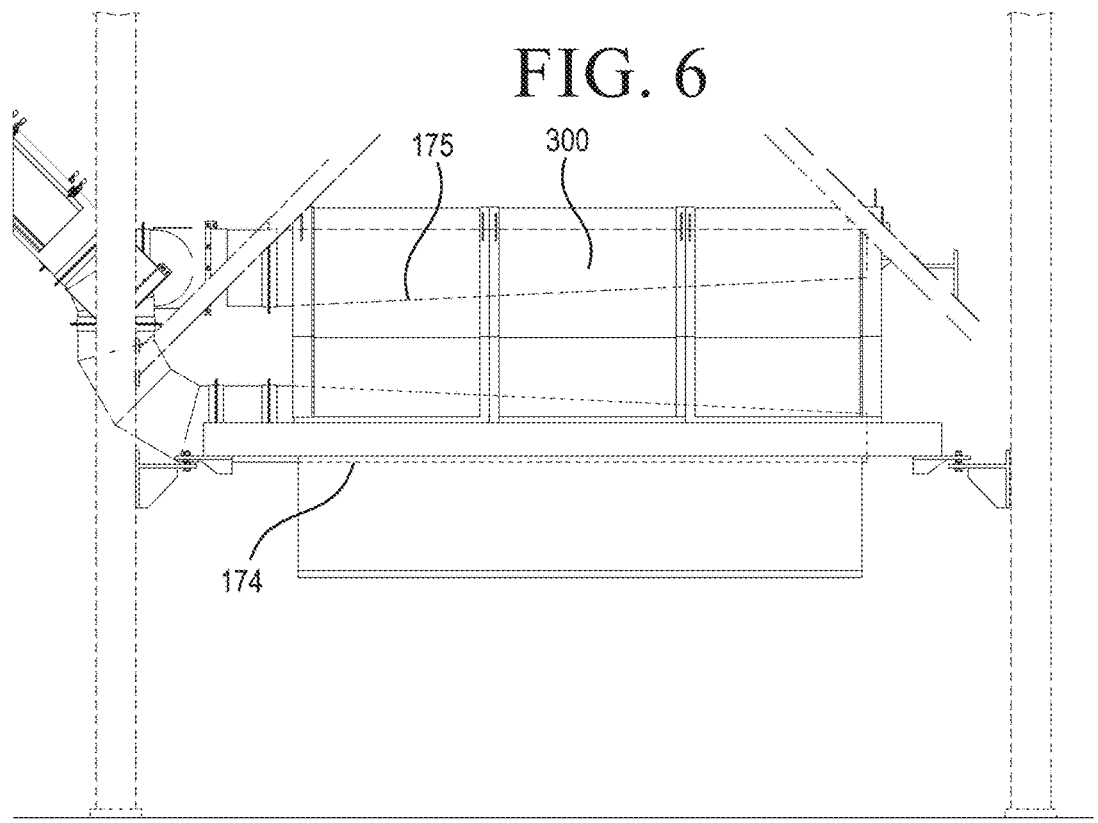
FIG. 6 is an end elevational view of the calender stack collection plenum of FIG. 4.

Referring to FIGS. 2 and 3, an exemplary installation of a wet scrubber assembly 25 is shown. One skilled in the art will appreciate that other arrangements are possible. One skilled in the art will discern other features and advantages of a wet scrubber assembly following principles of the present disclosure.

Referring to FIGS. 4-10, in embodiments, the exhaust collection assembly includes multiple adjustable dust and vapor collection plenums by the paper machine rewinder and calender stack in the area where mold resistant chemicals are added, and in the area where dust is generated from the slitting and rewinding process. In the illustrated arrangement, particulate-laden air can be evacuated from the dry end of the paper machine through the three dust collection pick up points and a canopy hood that ties into two dust manifolds, one "dry" and one "wet". The exhaust gas stream can be conveyed via suitable ductwork to a wet scrubber assembly for cleaning, such as is shown in FIGS. 2 and 3, for example.

In embodiments, enclosures can be provided at a paper-manufacturing station, such as, around the calender stack and the rewinder, for example, to help define the operational area from which air is drawn into the respective collection plenums. In embodiments, curtains and/or sheeting can be provided to further prevent draft air flow from interfering with the collection of particulate and vapor. In embodiments, a source of make-up air is provided at each operational area from which air is exhausted via the system 20. In embodiments, additional air make-up is provided in at least one location along the paper machine line to make up for the extra exhaust air pulled from the building by the system 20.

In embodiments, at least one collection plenum of the collection assembly can be disposed at a paper-manufacturing station in the form of a calender stack. The calender stack can include a source of an antimicrobial composition which includes an antimicrobial additive. The calender stack is adapted to apply a coating of the antimicrobial composition to the paper. As part of the application of the antimicrobial composition to the paper, the antimicrobial additive can be discharged into the air surrounding the operational area within which the calender stack is dispose. The calender collection plenum is disposed in proximate relationship to the calender stack and is configured to draw in particulate-laden air created by coating the paper with the antimicrobial composition.

Referring to FIGS. 4-7, a calender exhaust collection arrangement is shown at a paper-manufacturing station including a calender stack which includes first and second calender collection plenums 174, 175 disposed underneath a calender canopy hood 300. The calender canopy hood 300 can be configured to interact with an associated frame 305 of the calender stack area to help define an operational area 308. In embodiments, the frame 305 has suitable openings defined therein to permit the entry and egress of the paper 309 through the operational area 308.

The first calender collection plenum 174 includes a piece of sheeting 310 depending therefrom to further enclose an operational area adjacent the calender stack equipment. A gutter 312 can be attached to a terminal end of the sheeting 310 to help collect any condensate that may drip from the intake opening of the first calender collection plenum.

Figure 9:
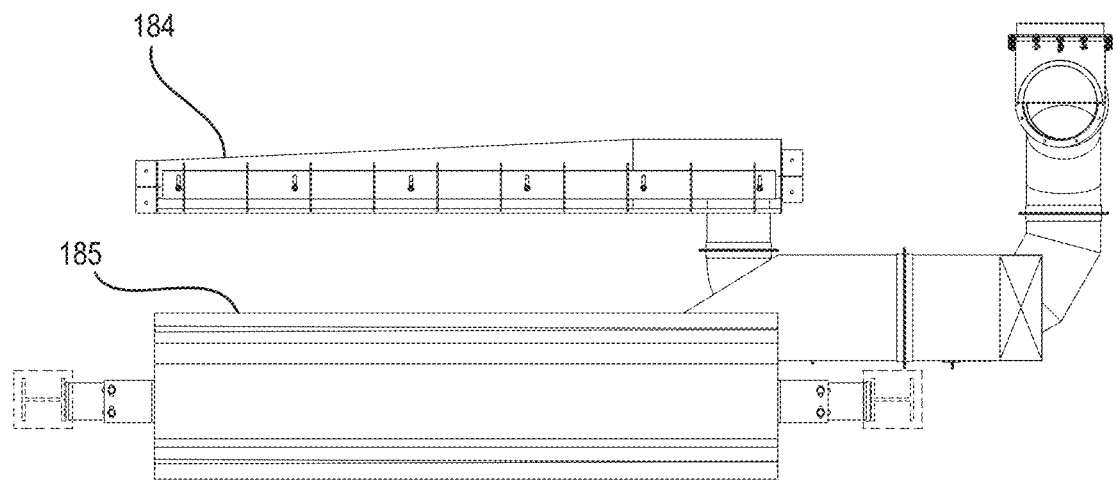
FIG. 9 is a top plan view of the rewinder collection plenum assembly of FIG. 8.
Figure 10:
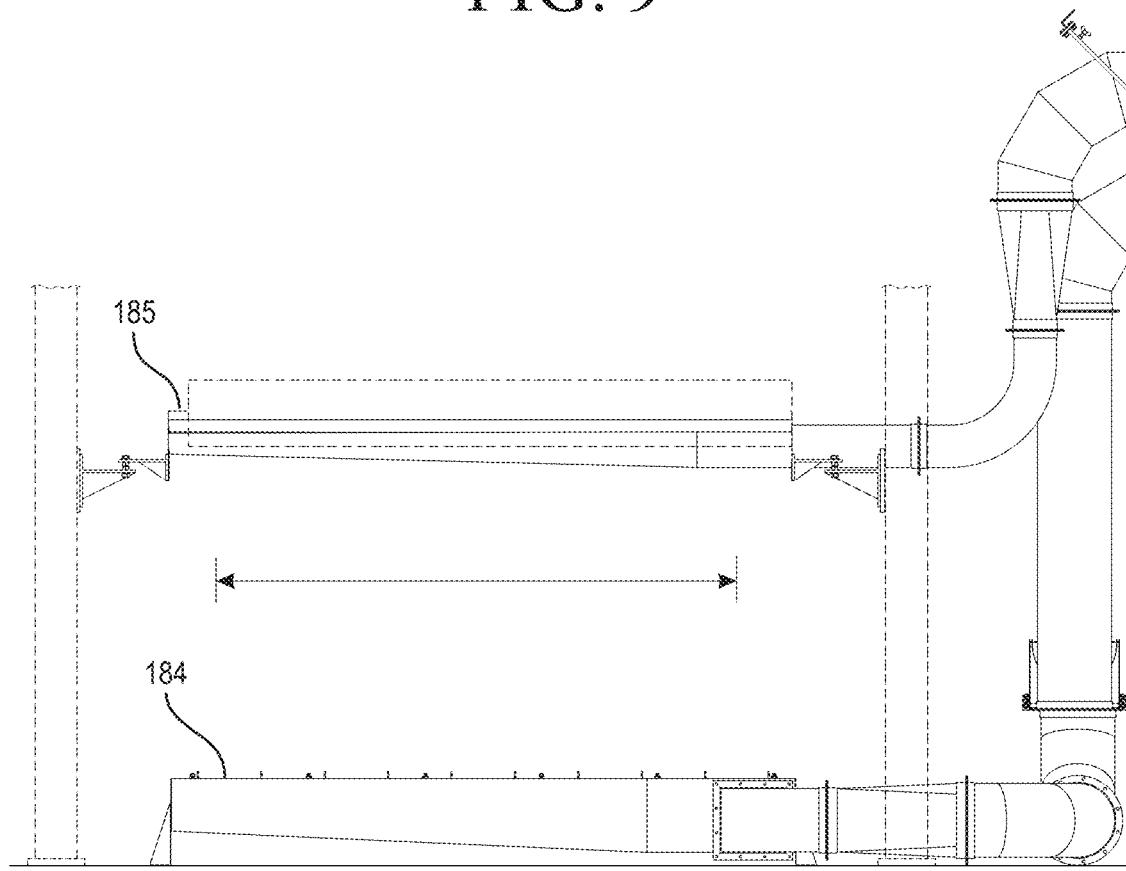
FIG. 10 is an end elevational view of the rewinder collection plenum assembly of FIG. 8.

Referring to FIGS. 8-10, a rewinder exhaust collection arrangement is shown which includes first and second rewinder collection plenums 184, 185 at a paper-manufacturing station having a rewinder. The first and second rewinder collection plenums 184, 185 are positioned adjacent the rewinder turning roll and the rewinder carrier roll, respectively. In embodiments, at least one of the rewinder collection plenums 184, 185 is disposed in proximate relationship to the rewinder. In embodiments, at least one collection plenum of the collection assembly can be disposed at a paper-manufacturing station in the form of a rewinder. In embodiments, at least one of the rewinder collection plenums 184, 185 can be configured to be in encircling relationship with at least an arc segment of an associated roll.

In embodiments, at least one of the rolls at the rewinder station comprises a slitter roll with a plurality of slitter knives associated therewith which are adapted to cut the paper to a nominal width within a predetermined tolerance. The air within the operational area of the rewinder can comprise particles produced by cutting the paper at the rewinder station with the cutting roll. In embodiments, the first and second rewinder collection plenums 184, 185 define process intake openings that are wider than the nominal width of the paper.

In embodiments, a system for preparing mold-resistant paper following principles of the present disclosure can include enclosures around the calender stack and one or more exhaust collection plenums positioned at the calender stack and rewinder station to draw particulate and fumes from the papermaking process during use of an antimicrobial additive for making mold-resistant paper. Exhaust collection plenums with controlled dampers can be provided that allow for air to be drawn from the paper machine line or from the ambient air in order to operate by pulling air either from the process or away from the process, such as during tail threading, for example. The system can be adjusted to develop efficient air flow at each respective collection plenum to pull particulate from the paper and into the wet scrubber assembly. In embodiments, various structural features are provided that help reduce cross drafts in the operational area from which the collection plenum is drawing intake air so as not to reduce the interference with particulate and vapor collection. Examples of such structural features include curtains, containment around the process, and/or air dispersing units (e.g., intake fans). A controller can be provided that is programmed to control and monitor the position of the various dampers in the exhaust collection assembly so that particulate is pulled efficiently away across the sheet in each desired area. In embodiments, a profiling slot of a given collection plenum can be adjusted across the paper web to maintain an adequate pressure drop across the paper web when the intake pulls from one side of the web.

In embodiments, a system for preparing mold-resistant paper according to principles of the present disclosure can be used to produce mold-resistant paper using an antimicrobial composition including a cofungicide at the calender stack while reducing the amount of airborne cofungicide particulate that may cause operator irritation. In embodiments, a system for preparing mold-resistant paper according to principles of the present disclosure can be used to produce mold-resistant paper, which, in turn, is used in preparing a gypsum panel that achieves a rating of eight or greater in a test following a protocol set forth in ASTM D3273-12.

In embodiments of a method of preparing paper following principles of the present disclosure, a system constructed according to principles of the present disclosure is used to make a mold-resistant paper having a coating of an antimicrobial composition to the paper. In embodiments, a method of preparing following principles of the present disclosure can be used with any embodiment of a system for preparing paper according to principles discussed herein.

For example, in one embodiment, a method of preparing paper following principles of the present disclosure includes placing a collection plenum within an operational area at which a paper-manufacturing station is disposed. The collection plenum is in fluid communication with a wet scrubber assembly. The wet scrubber assembly is operated to draw particulate-laden air from the operational area into the collection plenum and to direct the particulate-laden air to the wet scrubber assembly as a stream of particulate-laden exhaust air. The stream of particulate-laden exhaust air is conveyed through the wet scrubber assembly to remove particulate therefrom to produce a cleaned exhaust air stream. The cleaned exhaust air stream is vented from the wet scrubber assembly.

In another embodiment, a method of preparing paper following principles of the present disclosure includes disposing a collection plenum adjacent an operational area at which a paper-manufacturing station is disposed. The collection plenum is in fluid communication with a wet scrubber assembly. The paper-manufacturing station is operated such that particulate comprising an antimicrobial additive is emitted into air within the operational area.

In embodiments, the paper-manufacturing station can be any suitable manufacturing station as known to those skilled in the art. In embodiments, operating the paper-manufacturing station causes particulate comprising an antimicrobial additive to be discharged into the air within the operational area.

In embodiments, the paper-manufacturing station can comprise a calender stack. In embodiments, operating the calender stack includes applying a coating of an antimicrobial composition to the paper. The antimicrobial composition includes the antimicrobial additive. In such embodiments, the collection plenum can comprise a calender collection plenum that is disposed in proximate relationship to the calender stack.

In embodiments, the paper manufacturing station can comprise a rewinder. In embodiments, operating the rewinder includes cutting the paper to a predetermined width and winding the cut paper upon a roll. In such embodiments, the particulate-laden air can comprise particles produced by cutting the paper at the rewinder. The collection plenum can comprise a rewinder collection plenum that is disposed in proximate relationship to the rewinder.

An exhaust fan of the wet scrubber assembly is operated to draw a flow of particulate-laden air from the operational area into the collection plenum and to direct the flow of particulate-laden air to a venturi scrubber of the wet scrubber assembly. The flow of particulate-laden air is conveyed through the venturi scrubber along an exhaust flow path such that the flow of particulate-laden air is accelerated and passes through a water stream within the venturi scrubber, thereby entraining particulate from the flow of particulate-laden air in water from the water stream to create a flow of an exhaust/liquid mixture. The flow of the exhaust/liquid mixture is decelerated in the venturi scrubber.

In embodiments, the flow of particulate-laden air passes through the water stream within the venturi scrubber such that the water stream atomizes into water droplets with encapsulated particulate. In embodiments of a method following principles of the present disclosure, a value of a flow characteristic of the water stream in the venturi scrubber is monitored. The flow characteristic of the water stream in the venturi scrubber is adjusted based upon the value of the flow characteristic.

In embodiments of a method following principles of the present disclosure, a value of a differential pressure across a throat section of the venturi scrubber is monitored. An operational parameter is varied based upon the value of the differential pressure to maintain the differential pressure within a predetermined range.

In a separator, water droplets with entrained particulate are removed from the flow of the exhaust/liquid mixture to produce a cleaned exhaust air stream and a drain flow of liquid with entrained particulate. The drain flow of liquid with entrained particulate is drained from the separator. The cleaned exhaust gas stream is vented from the separator.

In embodiments of a method following principles of the present disclosure, the water droplets with entrained particulate are removed from the flow of the exhaust/liquid mixture by conveying the flow of the exhaust/liquid mixture in a spinning manner through a cyclonic spin chamber of the separator. The drain flow of liquid with entrained particulate is drained from the separator via a separator liquid outlet below the cyclonic spin chamber. In embodiments, the drain flow of liquid is re-circulated to a pump. The pump is operated to provide the water stream within the venturi scrubber.

In embodiments, venting the cleaned exhaust gas stream from the separator includes passing the cleaned exhaust gas stream through a baffle area of the separator. The baffle area includes a plurality of baffles configured to reduce a spinning movement of the cleaned exhaust gas stream.

All references cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A system for preparing paper for a cementitious panel, the system comprising:
    a calender stack, the calender stack including a source of an antimicrobial composition, the antimicrobial composition including an antimicrobial additive, the calender stack being adapted to apply a coating of the antimicrobial composition to the paper;
    a rewinder, the rewinder disposed within an operational area including particulate-laden air, the rewinder including a cutting roll adapted to cut to a predetermined width the paper having the coating applied thereto, the rewinder including a roll over which the cut paper is positioned by winding the cut paper upon the roll, the particulate-laden air comprising particles produced by cutting the paper at the rewinder station, the particles comprising the antimicrobial additive;
    an exhaust collection assembly, the exhaust collection assembly including a rewinder collection plenum disposed at the operational area, the rewinder collection plenum being disposed in proximate relationship to the rewinder, the rewinder collection plenum defining an intake opening, the intake opening being wider than the width of the cut paper;
    a wet scrubber assembly, the wet scrubber assembly in fluid communication with the rewinder collection plenum of the exhaust collection assembly, the wet scrubber assembly including a venturi scrubber, a separator, an exhaust fan, a pump, and a supply of fluid, the venturi scrubber being in fluid communication with, and interposed between, the rewinder collection plenum and the separator, the exhaust fan being adapted to draw particulate-laden air from the operational area into the rewinder collection plenum and to direct the particulate-laden air to the venturi scrubber as a flow of particulate-laden air, the venturi scrubber being adapted to receive the flow of particulate-laden air from the operational area via the exhaust collection assembly, the venturi scrubber being in fluid communication with the pump to receive the supply of fluid therefrom, the venturi scrubber being configured such that the flow of particulate-laden air received from the operational area passes through the supply of fluid inside the venturi scrubber to entrain particulate from the flow of particulate-laden air in the supply of fluid and to create a flow of an exhaust/liquid mixture, the venturi scrubber being adapted to direct the flow of the exhaust/liquid mixture to the separator, the separator being adapted to separate liquid with entrained particulate from the exhaust/liquid mixture to produce a cleaned exhaust air stream and a drain flow of liquid with entrained particulate, the separator having an air outlet and a liquid outlet, the air outlet of the separator being in fluid communication with the exhaust fan, the exhaust fan being adapted to draw the cleaned exhaust air stream from the separator via the air outlet toward the exhaust fan, and the separator being configured such that the drain flow of liquid exits from the separator via the liquid outlet.

2. The system according to claim 1, wherein the rewinder collection plenum is configured such that the rewinder collection plenum is in encircling relationship with at least an arc segment of the roll.

3. The system according to claim 1,
    wherein the exhaust collection assembly includes a main collection passage, a rewinder trunk, a calender trunk, and a calender collection plenum, the main collection passage being in fluid communication with the venturi scrubber, the rewinder trunk and the calender trunk being in fluid communication with the main collection passage such that the rewinder trunk and the calender trunk are connected in parallel to the main collection passage, the rewinder trunk being in fluid communication with the rewinder collection plenum, the calender trunk being in fluid communication with the calender collection plenum, the calender collection plenum being disposed in proximate relationship to the calender stack;

wherein the exhaust fan is adapted to draw particulate-laden air from the operational area into the calender collection plenum and to direct the particulate-laden air to the venturi scrubber as the flow of particulate-laden air.

4. The system according to claim 1, wherein the wet scrubber assembly includes a flooded elbow, the flooded elbow being in fluid communication with, and interposed between, the venturi scrubber and the separator, the flooded elbow including an elbow outlet that defines a fluid reservoir within the flooded elbow below the elbow outlet.

5. The system according to claim 1, wherein the venturi scrubber includes an exhaust inlet, a fluid inlet, a converging section, a throat, and a diverging section:

the exhaust inlet being in fluid communication with the rewinder collection plenum of the exhaust collection assembly to receive the particulate— laden air therefrom, the fluid inlet being in fluid communication with the pump to receive the supply of fluid therefrom, the converging section being in fluid communication with, and interposed between, the exhaust inlet and the throat, the converging section having a converging shape configured such that a transverse cross-sectional converging area defined by an interior converging sidewall of the converging section decreases along an exhaust flow path from the exhaust inlet toward the throat, the throat being in fluid communication with, and interposed between, the converging section and the diverging section, the throat having a cylindrical shape such that a transverse cross-sectional throat area defined by an interior throat sidewall of the throat is substantially circular and substantially the same in the throat along the exhaust flow path from the converging section to the diverging section, and the diverging section being in fluid communication with, and interposed between, the throat and the separator, the diverging section having a diverging shape configured such that a transverse cross-sectional diverging area defined by an interior diverging sidewall of the diverging section increases along the exhaust flow path from the throat toward the separator.

6. The system according to claim 5, wherein the wet scrubber assembly includes a flooded elbow, the flooded elbow being in fluid communication with, and interposed between, the diverging section of the venturi scrubber and the separator, the flooded elbow including an elbow outlet that defines a fluid reservoir within the flooded elbow below the elbow outlet.

7. The system according to claim 1, wherein the separator comprises a cyclonic air separator.

8. The system according to claim 1, wherein the wet scrubber assembly includes an exhaust stack, the exhaust stack in fluid communication with the exhaust fan such that the cleaned exhaust air stream is conveyed from the exhaust fan out through the exhaust stack.

9. The system according to claim 3, wherein the rewinder collection plenum is configured such that the rewinder collection plenum is in encircling relationship with at least an arc segment of the roll.

* * * * *